(12) United States Patent
Miyashita et al.

(10) Patent No.: US 7,242,426 B2
(45) Date of Patent: Jul. 10, 2007

(54) DIGITAL STILL CAMERA FOR RECORDING IMAGES IN HIGH AND LOW SENSITIVITY MODES

(75) Inventors: Takeshi Miyashita, Asaka (JP); Kazuya Oda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 709 days.

(21) Appl. No.: 10/397,354

(22) Filed: Mar. 27, 2003

(65) Prior Publication Data

US 2003/0193573 A1    Oct. 16, 2003

(30) Foreign Application Priority Data

Mar. 27, 2002    (JP)   ............ P.2002-088785

(51) Int. Cl.
*H04N 5/235* (2006.01)
*H04N 9/64* (2006.01)
*H04N 5/335* (2006.01)
*H04N 3/14* (2006.01)

(52) U.S. Cl. ............. 348/229.1; 348/249; 348/317; 348/312

(58) Field of Classification Search ........... 348/300, 348/317, 320, 322, 249, 248
See application file for complete search history.

(56) References Cited

U.S. PATENT DOCUMENTS

| | | | | |
|---|---|---|---|---|
| 4,910,600 A | * | 3/1990 | Kondo | 348/221.1 |
| 4,963,980 A | * | 10/1990 | Suga et al. | 348/220.1 |
| 5,051,832 A | * | 9/1991 | Losee et al. | 348/220.1 |
| 5,589,881 A | * | 12/1996 | Dunham et al. | 348/300 |
| 5,610,654 A | * | 3/1997 | Parulski et al. | 348/229.1 |
| 5,668,597 A | * | 9/1997 | Parulski et al. | 348/350 |
| 5,838,373 A | * | 11/1998 | Hasegawa et al. | 348/312 |
| 6,130,420 A | * | 10/2000 | Tanaka et al. | 250/208.1 |
| 6,169,577 B1 | * | 1/2001 | Iizuka | 348/317 |
| 6,496,224 B2 | * | 12/2002 | Ueno | 348/322 |

(Continued)

FOREIGN PATENT DOCUMENTS

JP    10-136391 A    5/1998

OTHER PUBLICATIONS

"Nikon Coolpix 990 review:p. 5. Operational [Digital Photography Review]," C.1998-2000, pp. 1-4, http://www.dpreview.com/reviews/nikoncp990/page5.asp.*

*Primary Examiner*—Ngoc-Yen Vu
*Assistant Examiner*—Richard M. Bemben
(74) *Attorney, Agent, or Firm*—Birch, Stewart, Kolasch & Birch, LLP

(57) ABSTRACT

The present invention provides a digital still camera that can read high quality image data from a solid state image pickup device in both the low and the high sensitivity modes. The digital still camera according to the present invention includes shooting mode selecting means for checking and setting a shooting mode and reading mode selecting means for selecting a suitable reading mode in accordance with the set shooting mode. As the reading mode, full-pixel reading mode and two-field reading mode are provided in this invention. The digital still camera also includes a solid state image pickup device having imaging pixels for accumulating signal charges of an image. Since the signal charges are read in the suitable reading mode, it is possible to avoid mixing colors or decreasing signal charges as time go on. Therefore, it is possible to obtain a high quality image data.

13 Claims, 6 Drawing Sheets

U.S. PATENT DOCUMENTS

| | | | |
|---|---|---|---|
| 6,559,889 B2 * | 5/2003 | Tanaka et al. | 348/299 |
| 6,628,328 B1 * | 9/2003 | Yokouchi et al. | 348/221.1 |
| 6,778,215 B1 * | 8/2004 | Nakashima et al. | 348/314 |
| 6,798,448 B1 * | 9/2004 | Motono et al. | 348/222.1 |
| 2001/0004271 A1 * | 6/2001 | Konishi | 348/371 |
| 2003/0146986 A1 * | 8/2003 | Calderwood | 348/240.1 |

* cited by examiner

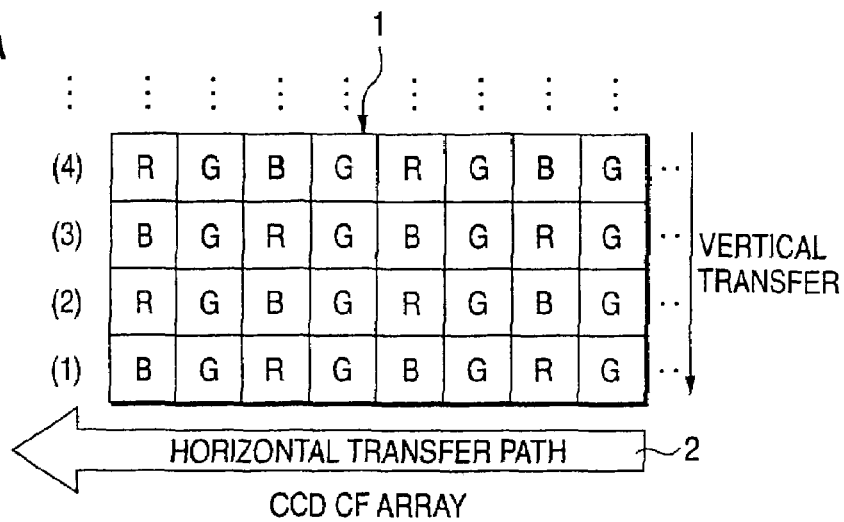

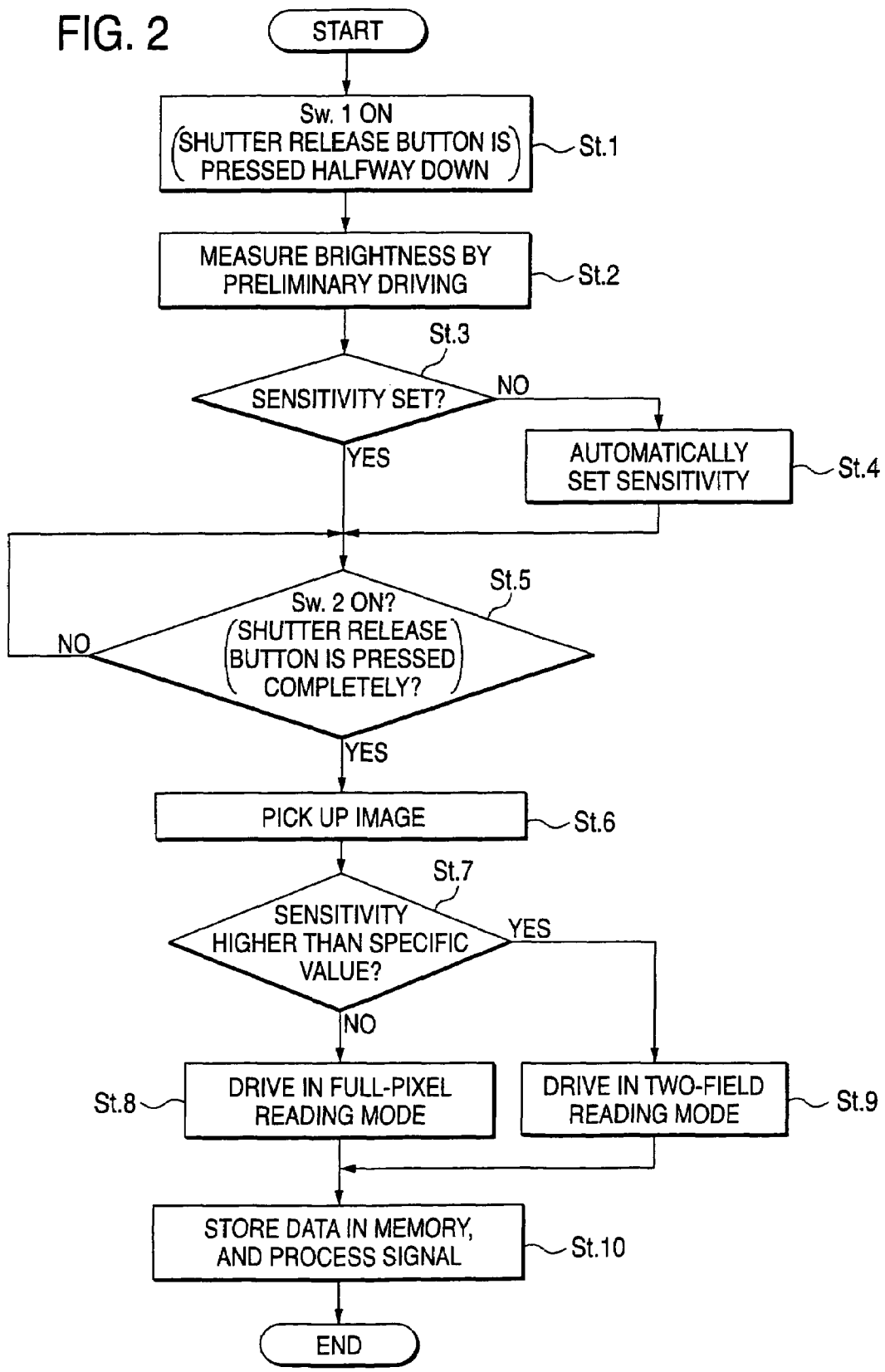

DIGITAL STILL CAMERA FOR RECORDING IMAGES IN HIGH AND LOW SENSITIVITY MODES

BACKGROUND OF THE INVENTION

1. Field of the Invention

The present invention relates to a digital still camera. In particular, the present invention relates to a digital still camera that can read high quality image data from an image pickup device in both a low sensitivity mode and a high sensitivity mode.

2. Description of the Related Art

Among the digital still cameras having a mounted image pickup device such as a CCD, there are some for which sensitivity can be altered. One example digital still camera for which film sensitivity can be set has a low sensitivity mode, used for shooting at a low sensitivity corresponding to an ISO standard of from 100 to 400, and a high sensitivity mode, used for shooting at a high sensitivity corresponding to an ISO standard equal to or greater than 800. In the low sensitivity mode, the amount of the signal charges accumulated by each imaging pixel (photodiode) is increased because the period the shutter is open is extended. While in the high sensitivity mode, the amount of the signal charges accumulated by each imaging pixel is reduced because the period the shutter is open is reduced.

The signal charges accumulated by the imaging pixels are read and transmitted along a vertical transfer path. FIG. 8 is a graph showing a transient change in the amount of the signal charges, i.e., the number of electrons accumulated by the individual imaging pixels. After the shutter is closed, the amount of the signal charges is exponentially reduced by thermal diffusion as time elapses. Therefore, if the signal charges are not immediately read from the image pickup device, the quality of the produced image will be degraded.

The signal charges read from the imaging pixels and transmitted via the vertical transfer path pass through potential wells sequentially formed along the vertical transfer path. Specifically, however, each time charges are transmitted tiny numbers of electrons remain in the potential wells. As a result, these electrons are mixed with signal charges read from imaging pixels for the next colors and are transmitted along the vertical transfer path. This is another factor that contributes to the degradation of the image quality.

In the high sensitivity mode, the individual imaging pixels accumulate only a small amount of signal charges. When these signal charges are gradually reduced while being transmitted along the vertical transfer path, the signal charges are mixed with other signal charges for other colors. Therefore, because the original signal charges are small, the effect produced by color mixing is increased and the image quality is degraded. However, as is apparent from FIG. 8, when the signal charges are small (the foot portion of the characteristic line in FIG. 8), likewise, the rate at which the number of electrons is reduced as time elapses is small, so that the effect is reduced, even when it takes time to read signal charges from the image pickup device.

In the low sensitivity mode, a large amount of signal charges are accumulated in the individual imaging pixels. Even when a specifically tiny number of electrons remains in each potential well along the vertical transfer path, and is mixed with signal charges for other colors, image deterioration due to color mixing is so small it can be ignored because the original signal charges are large. However, as is apparent from FIG. 8, when the signal charges are large, there is an increased reduction in the number of electrons as time elapses, and this phenomenon can not be ignored as a factor that can contribute to image deterioration.

As described above, the problems encountered when photographing in the high sensitivity mode or in the low sensitivity mode are the direct opposites of those encountered in the opposing mode, and if both sets of problems are not resolved, the image quality in the two modes can not be improved.

SUMMARY OF THE INVENTION

It is, therefore, one objective of the invention to provide a digital still camera that can read high quality image data from an image pickup device in both the low and the high sensitivity modes.

To achieve this objective, a digital still camera according to the present invention includes an image pickup device in a solid state, which reads signal charges accumulated by imaging pixels and which transfers the signal charges along a vertical transfer path, wherein for the imaging pixels color filters are horizontally arranged so that on every other line the color filters form corresponding patterns; a shooting mode selector for selecting either a low sensitivity mode or a high sensitivity mode; and an image pickup device driver for, when the shooting mode selector selects the low sensitivity mode, reading signal charges from the image pickup device in the full-pixel reading mode, and for, when the shooting mode selector selects the high sensitivity mode, reading signal charges from the image pickup device in two or more even-numbered field reading modes.

With this configuration, high quality image data can be read from the image pickup device, in both the high sensitivity mode and the low sensitivity mode, without any reduction in the image resolution.

Preferably, the digital still camera further includes a current controller for, when the shooting mode selector selects the high sensitivity mode, controlling the strength of a current supplied to an output signal amplification circuit, provided at the final stage of the image pickup device, or a current amplification circuit, connected to the output terminal of the image pickup device.

With this configuration, the S/N of the image data obtained in the high sensitivity mode and read from the image pickup device is increased, and reductions in the power consumed and in the heat generated are also possible.

Also, to achieve this objective, a digital still camera includes an image pickup device in a solid state wherein, at the final stage, an output signal amplification circuit is provided for outputting a power signal; a current amplification circuit connected to the output terminal of the image pickup device; a first current source for supplying a current to the output signal amplification circuit; a second current source for supplying a current to the current amplification circuit; and a current controller for, when a high sensitivity shooting mode is used for which the sensitivity is equal to or greater than a predetermined value, controlling either the current supplied to the output signal amplification circuit by the first current source or the current supplied to the current amplification circuit by the second current source.

With this configuration, the S/N of the image data obtained in the high sensitivity mode can be increased, and reductions in the power consumed and in the heat generated are also possible.

BRIEF DESCRIPTION OF THE DRAWINGS

FIG. 1A is a schematic plan view of one part of a solid-state image pickup device mounted in a digital still camera according to a first embodiment of the present invention;

FIG. 1B is a diagram showing an arrangement of color data in the full-pixel reading mode when imaging pixels are read from the image pickup device in FIG. 1A;

FIG. 1C is a diagram showing an arrangement of color data when the imaging pixels are read from the image pickup device in FIG. 1A in the interlaced (two-field) reading mode;

FIG. 2 is a flowchart showing the operation of the digital still camera according to the first embodiment of the invention;

Figure 3A:
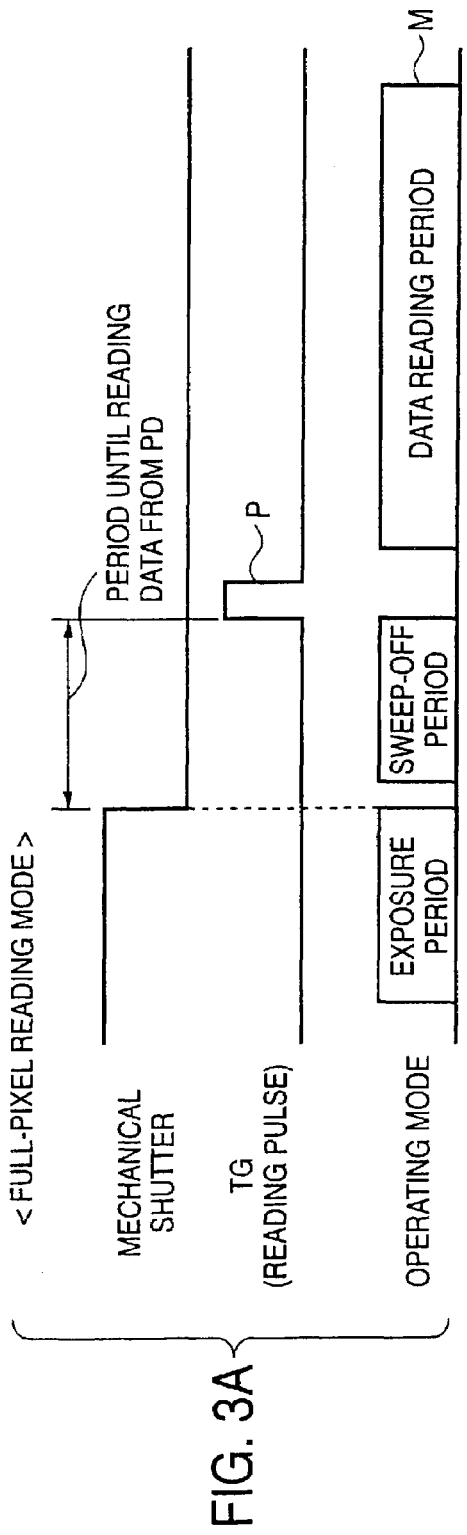
FIG. 3A is a timing chart for a method for driving the solid-state image pickup device in a full-pixel reading mode according to the first embodiment of the invention.

In the drawings, each of the reference signs P, P1, and P2 refers to a read pulse; N, N1, and N2 each refers to a sweep-off period; and M, M1, and M2 each refers to a data reading period.

The reference numeral 1 and 10 each refers to a solid-state image pickup device; 11 to a current amplifier; 14 to a CPU; 16 to a current source for an amplifier; 17 to a current source for solid-state image pickup device final stage; and 20 to FDA (floating diffusion amplifier).

DETAILED DESCRIPTION OF THE PREFERRED EMBODIMENTS

The preferred embodiments of the invention will now be described while referring to the drawings.

FIG. 1A is a schematic plan view, according to a first embodiment of the invention, of one part of a image pickup device mounted in a digital still camera. The image pickup device is solid state. In an image pickup device 1, imaging pixels BGRGBGRG . . . are arranged in the named order along row (1), the row nearest a horizontal transfer path 2; imaging pixels RGBGRGBG . . . are arranged in the named order along the next row (2); imaging pixels BGRGBGRG . . . are arranged along row (3) in the same named order as that used for row (1); and imaging pixels RGBGRGBG . . . are arranged along the next row (4) in the same named order as that used for row (2). Thereafter, the same imaging pixel patterns are used for subsequent rows. That is, the same color pattern is used for the imaging pixel arrangements in all odd-numbered rows, and the same color pattern is used for the imaging pixel arrangements in all even-numbered rows. It should be noted that B is an imaging pixel (photodiode PD) having a blue filter, G is an imaging pixel having a green filter, and R is an imaging pixel having a red filter.

FIG. 1B is a diagram showing the arrangement of color data in the full-pixel reading mode when imaging pixels are read from the image pickup device 1 in FIG. 1A. In the full-pixel reading mode, all signal charges are read at the same time from all the imaging pixels in a row of the image pickup device and are simultaneously transmitted along the vertical transfer path, thereby enabling the rapid reading of data from the image pickup device. However, for the first column, as an example, since the signal charges BRBR . . . are simultaneously transmitted, in parallel, along the vertical transfer path, as is described above, color mixing of the blue (B) signal charges and the red (R) signal charges occurs.

FIG. 1C is a diagram showing the arrangement of color data when the imaging pixels are read from the image pickup device 1 in FIG. 1A in the interlaced (two-field) reading mode. In the first field, the signal charges are read only from the imaging pixels in the odd-numbered rows and transmitted along the vertical transfer path, and in the next or second field, the signal charges are read only from the imaging pixels in the even-numbered rows and transmitted along the vertical transfer path.

Figure 8:
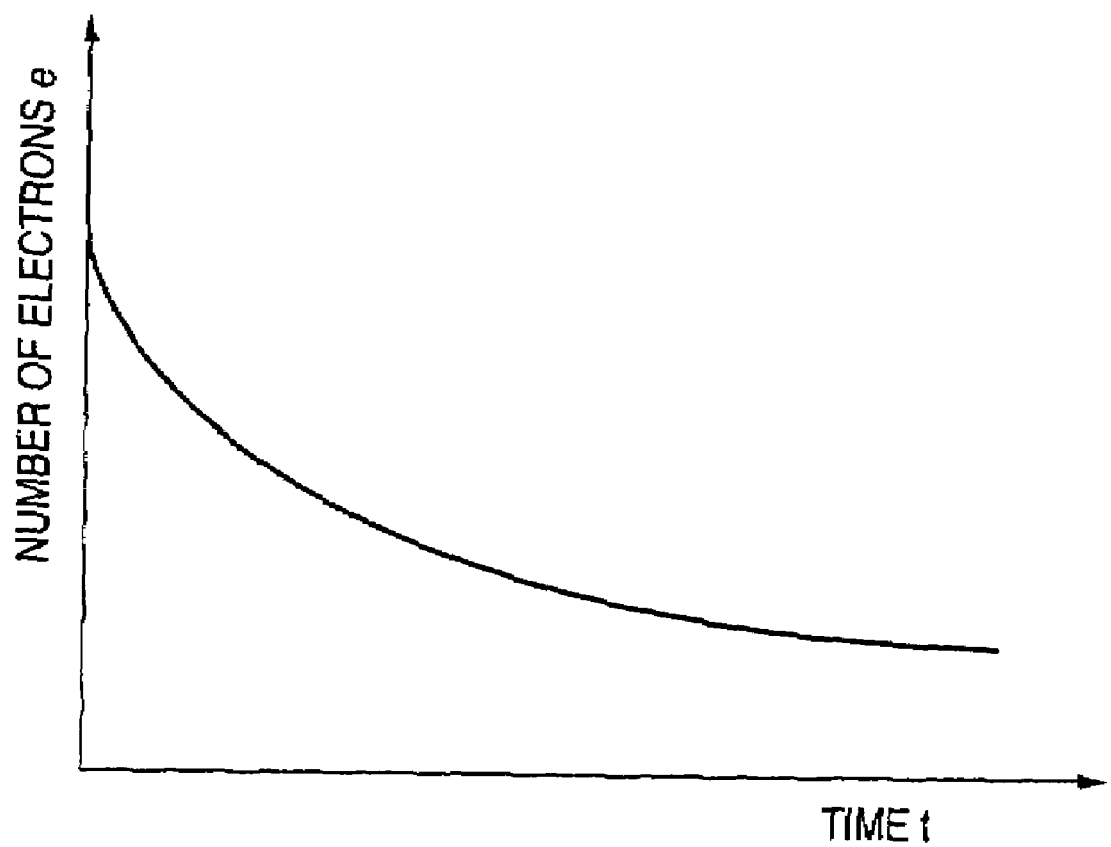
FIG. 8 is a graph showing the state wherein the amount of signal charges accumulated by imaging pixels are reduced as time elapses.

Therefore, even when vertically adjacent signal charges are mixed during transmission along the vertical transfer path, these are signal charges for the same color, so that color mixing does not occur and image deterioration is prevented. However, since data reading from the image pickup device is performed two times, as will be described later, it takes time for the signal charges to be read to the vertical transfer path, and as is shown in FIG. 8, the number of electrons is reduced as time elapses.

The feature of the digital still camera according to this embodiment is that, to resolve these problems, depending on the situation the image pickup device is driven by employing either the full-pixel reading mode or the interlaced reading mode, as will be described below.

FIG. 2 is a flowchart showing the operation of the digital still camera according to this embodiment. When the power switch for the digital still camera is turned on, the program shown in FIG. 2 is started, and when, thereafter, a user presses a shutter release button halfway down, switch 1 (Sw. 1) of a two-step switch is turned on (St. 1). Then, after Sw. 1 has been turned on, a photometric process and distance measurement are performed at step 2 (St. 2) and a check is performed at step 3 (St. 3) to determine whether a shooting mode has been set by the user.

When it is determined that the shooting mode has not been set by the user, program control moves from St. 3 to step 4 (St. 4), whereat a sensitivity is automatically set, in other word, the shooting mode is automatically set. Program control thereafter advances to step 5 (St. 5). If, however, it is determined that the shooting mode has been set by the user, program control advances directly from St. 3 to St. 5.

At St. 5, execution of the program is paused until the two-step shutter release button is pressed completely. Then, when the release button has been pressed completely, switch 2 (Sw. 2) of the two-step switch is turned on, and at step 6 (St. 6) the photographic process is begun. For this process, a shutter is opened and closed during an exposure period consonant with the light value obtained by the photometric process, the depth of focus for a taking lens is adjusted until it is set for a point consonant with the measured distance, and image data (signal charges) for an object on which the lens is focused are accumulated in each imaging pixel of the image pickup device.

At step 7 (St. 7), a check is performed to determine whether the sensitivity of the shooting mode set by the user or automatically set at step 4 (St. 4), is greater than a predetermined sensitivity value that is set in advance. When the decision is negative (No), i.e., when the sensitivity of the set mode is smaller than the predetermined sensitivity value, program control advances to step 8 (St. 8), whereat the image pickup device is driven in the full-pixel reading mode and image data is read from the image pickup device. In the other word, the full-pixel reading mode is applied to image data shot in a low sensitivity mode.

When the decision at St. 7 is affirmative (Yes), the sensitivity of the set shooting mode is greater than the predetermined sensitivity value, program control is shifted to step 9 (St. 9), whereat the image pickup device is driven in the two-field reading mode (the interlaced reading mode) and image data is read from the image pickup device. In the other word, the two-field reading mode is applied to image data shot in a high sensitivity mode.

When the image pickup device is driven at St. 8 or St. 9 and the image data is read, program control advances to step S10 (St. 10), whereat the obtained image data is stored in memory and signal processing is preformed. The processing in FIG. 2 is thereafter terminated.

Figure 3B:
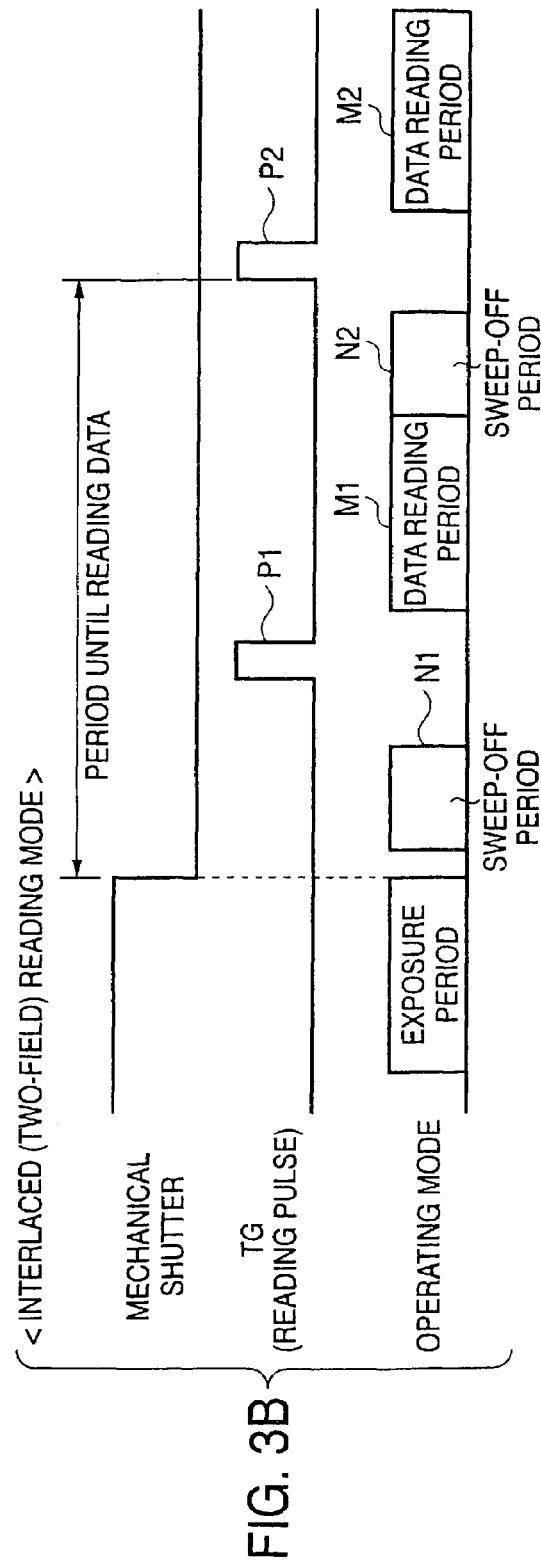
FIG. 3B is a timing chart for a method for driving the solid-state image pickup device in an interlaced reading mode according to the first embodiment of the invention.

FIGS. 3A and 3B are timing charts showing a method for driving the image pickup device. In this embodiment, in the low sensitivity mode, the image pickup device is driven in the full-pixel reading mode in FIG. 3A, and in the high sensitivity mode, the image pickup device is driven in the interlaced reading mode in FIG. 3B.

(a) Operation in the Full-pixel Reading Mode

The exposure period for the digital still camera normally extends from the opening of the electronic shutter (at this time a mechanical shutter is opened) to the closing of the mechanical shutter. During this exposure period, signal charges are accumulated by the imaging pixels (photo diodes PD) of the image pickup device.

After the signal charges have been accumulated, first, instead of the signal charges being read immediately, the vertical transfer path is driven rapidly using a sweep-off pulse. As a result, electric charges or noise charges retained on the vertical transfer path are swept off, and the vertical transfer path is cleaned. Following this, a read pulse P is transmitted to the reading gates of the imaging pixels, and the signal charges are read from all the imaging pixels of the image pickup device to the vertical transfer path adjacent to the imaging pixels. A transfer potential is then applied sequentially to the individual transfer electrodes composing the vertical transfer path, and signal charges from potential wells formed in the vertical transfer path are sequentially transmitted (performed during a data reading period M in FIG. 3A). The reading of image data from the image pickup device is thereafter terminated.

In the full-pixel reading mode, the period during which the signal charges are read from the imaging pixels to the vertical transfer path extends from the closing of the mechanical shutter to the transmission of the reading pulse P. Since this period is so short, image deterioration due to a reduction in the number of electrons, as explained in FIG. 8, can be ignored.

Further, as is described above, in the low sensitivity mode a large number of signal charges is transmitted, and even when during the transmission of the signal charges specific, tiny numbers of residual electrons are mixed with signal charges from imaging pixels for other colors, the image quality is not adversely affected.

(b) Operation in the Interlaced Reading Mode

The same process as in the full-pixel reading mode is performed until, immediately following the end of the exposure period, the sweep-off pulse is used to clean the vertical transfer path. After that, however, the interlaced reading mode differs from the full-pixel reading mode in that, as explained while referring to FIG. 1C, reading and transmission is first performed for signal charges held by the imaging pixels in the odd-numbered rows, and is then performed for signal charges held by the imaging pixels in the even-numbered rows.

That is, upon the completion of a sweep-off period N1, performed immediately following the exposure period, first, a reading pulse P1 is applied to the reading gates of the imaging pixels in the odd-numbered rows and the signal charges held by these imaging pixels are read to and transmitted along the vertical transfer path (performed during the data reading period M1 in FIG. 3B).

Since a small number of charges remains along the vertical transfer path, following the period M1 a sweep-off period N2 is provided during which the sweep-off pulse is used to drive the vertical transfer path rapidly and clear it. Thereafter, a reading pulse P2 is applied to the reading gates of the imaging pixels in the even-numbered rows and the signal charges held by these imaging pixels are read to and transmitted along the vertical transfer path (performed during a data reading period M2 in FIG. 3B).

As is described above, from the closing of the mechanical shutter in the interlaced reading mode to the reading of signal charges from the imaging pixels in the even-numbered rows, the time is increased. However, since in the high sensitivity mode the number of signal charges is small and corresponds to the foot portion of the characteristic line in FIG. 8, even though it takes additional time to read signal charges from the imaging pixels, there is only a small reduction in the number of electrons and the image quality is not deteriorated.

When the number of signal charges is small, as in the high sensitivity mode, the effect produced by a tiny number of residual signal charges during the transmission is relatively great, and the image quality is deteriorated due to the mixing of signal charges with those for different colors. However, in the interlaced reading mode in this embodiment, since an image pickup device is employed wherein pixels are arranged so that the color filters in every other line have the same pattern, as is explained while referring to FIG. 1C, signal charges are mixed with others for the same colors, not with those for different colors, and deterioration of the image quality can be prevented.

Furthermore, in this embodiment, although the interlaced reading mode is a two-field reading mode, the same process can be performed for reading from two or more evenly numbered fields.

As is described above, in this embodiment, since the method used to drive the image pickup device differs for the low sensitivity mode and the high sensitivity mode, high quality image data can be read from the image pickup device in both of the two sensitivity modes. Further, high quality image data can be obtained without the image resolution, either in the high sensitivity mode or the low sensitivity mode, being reduced.

Further, although the image pickup device in FIG. 1 is a CCD of a Bayer type, the present invention can also be applied for an image pickup device proposed by the present inventor and disclosed in JP-A-10-136391, i.e., an image pickup device employing a honeycomb pixel arrangement wherein imaging pixels are arranged so that the pixels in each row are shifted ½ pitch from those in a vertically adjacent row.

Figure 4:
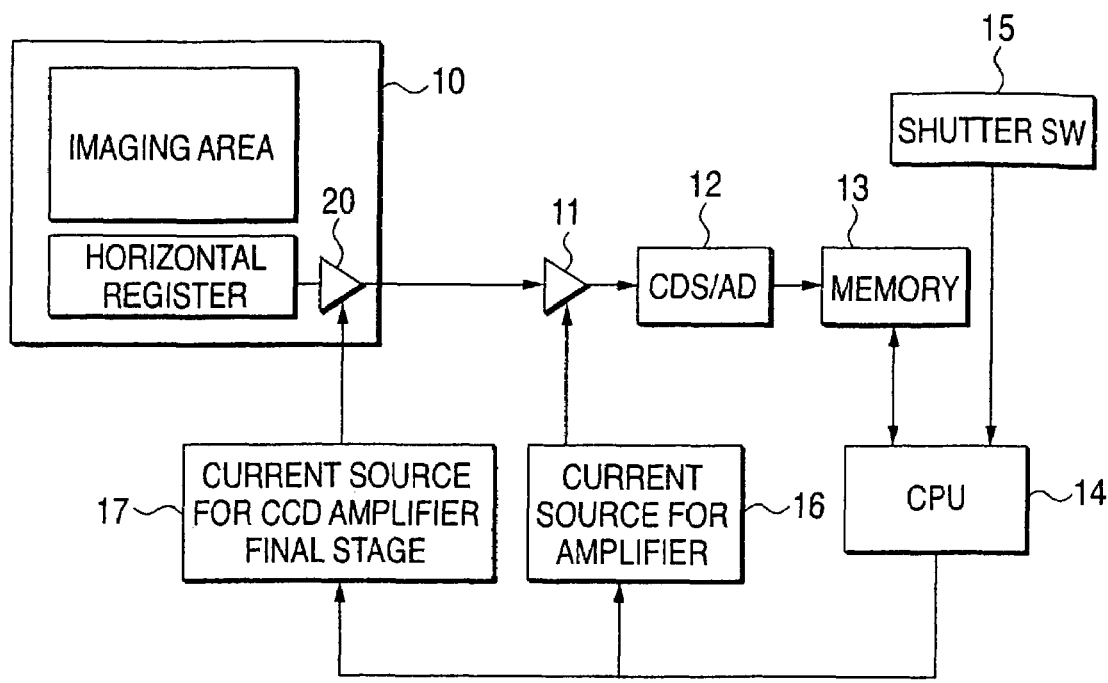
FIG. 4 is a diagram showing the configuration of a digital still camera according to a second embodiment of the invention.

FIG. 4 is a diagram showing the configuration of a digital still camera according to a second embodiment of the present invention. This digital still camera comprises: a solid-state image pickup device 10; a current amplifier 11 connected to the output terminal of the solid-state image pickup device 10; a CDS (double sampling circuit)/AD (analog/digital) converter 12 connected to the output terminal of the current amplifier 11; a memory 13 connected to the output terminal of the CDS/AD converter 12; a CPU 14 that provides overall control for the digital still camera; a shutter switch 15 for transmitting to the CPU 14 a signal indicating a photographic timing; and an amplifier, current source 16 and a solid-state image pickup device final stage, current source 17 for which control is provided by instruction signals output by the CPU 14.

Figure 5:
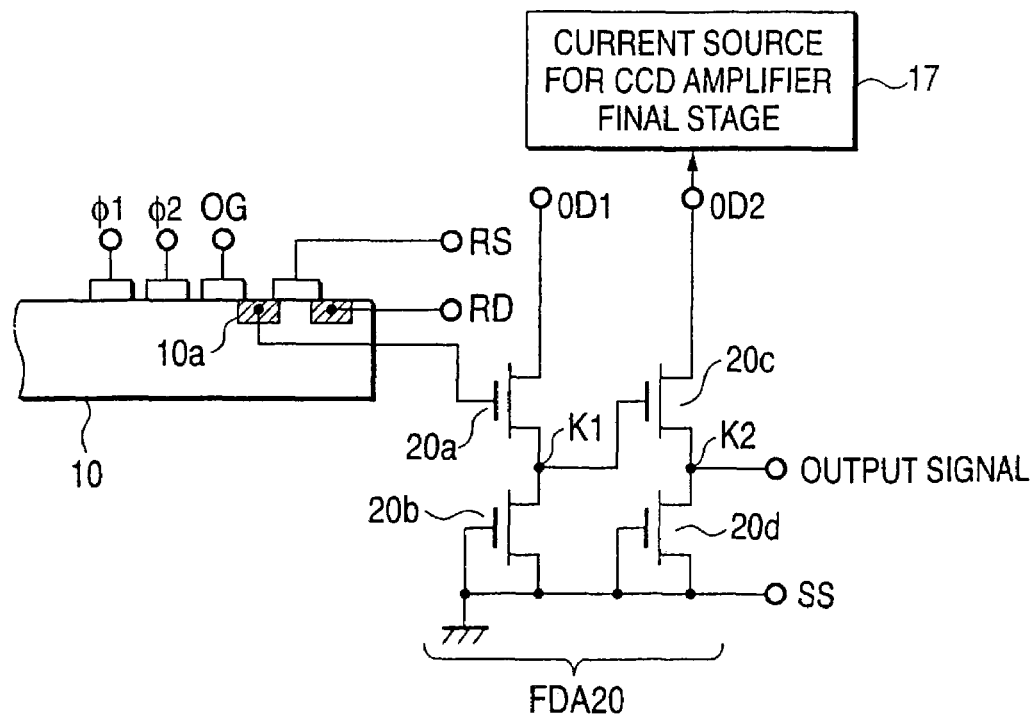
FIG. 5 is a diagram showing the configuration of an example FDA provided at the final stage of the solid-state image pickup device in FIG. 4.

A floating diffusion amplifier (FDA) 20 is provided at the output terminal of the solid-state image pickup device 10, a device such as a CCD. FIG. 5 is a diagram showing an example configuration for the FDA 20 according to this embodiment. The FDA 20 is constituted by a two-stage source follower circuit for which, at the first stage, an FET 20a and an FET 20b are connected in series, and for which, at the final stage, the gate terminal of the FET 20a is connected to a potential well 10a. When a constant current source is connected to the source terminal OD1 of the FET 20a, a voltage signal, to be applied to the gate terminal of the FET 20a, is generated at a connection point K1 between the FET 20a and the FET 20b in consonance with the amount of signal charges that have accumulated at the potential well 10a An FET 20c and an FET 20d, at the second stage of the FDA 20, are connected in series, and when the gate terminal of the FET 20c is connected to the connection point K1 and a current is supplied to the source terminal OD2 of the FET 20c, the voltage signal generated at the connection point K1 is amplified, and the amplified signal is output at a connection point K2 (output terminal) between the FET 20c and the FET 20d.

After the voltage signal consonant with the signal charges has been received at the final stage by the potential well 10a and has been output at the output terminal K2, a reset pulse is applied to a reset terminal RS. As a result, the signal charges accumulated in the potential well 10a are abandoned to the RD terminal side, and at a timing whereat the signal charges, which are the next pixel data, are transferred to the potential well 10a, a voltage signal consonant with these signal charges is also output at the output terminal K2.

Figure 6:
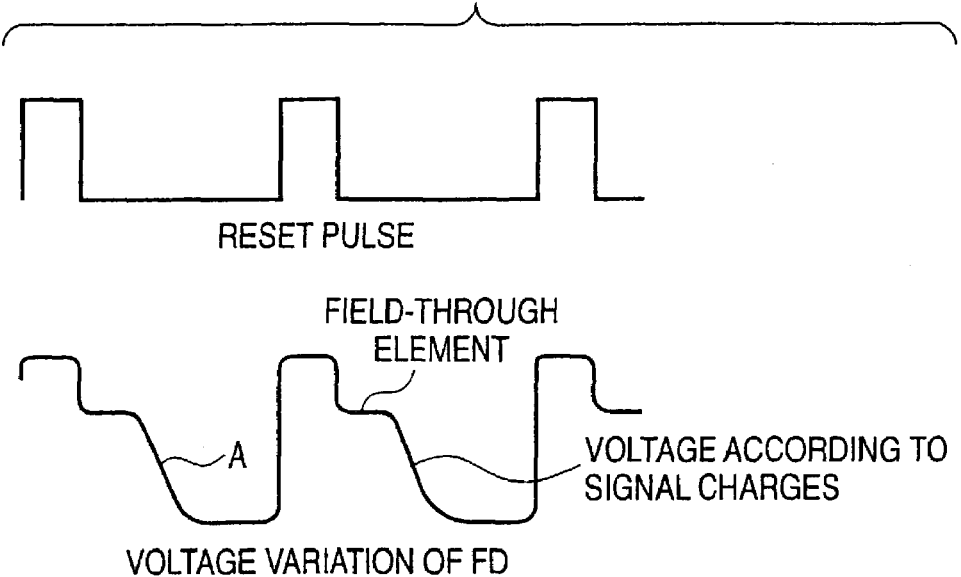
FIG. 6 is a signal waveform diagram for explaining the operation of the FDA in FIG. 5.

FIG. 6 is a diagram showing a reset pulse to be applied to the reset terminal RS of the solid-state image pickup device 10 in FIG. 5, and a voltage signal waveform (a potential change for FD) that appears at the terminal K1 in response to the application of the reset pulse. The voltage signal waveform appearing in the low sensitivity mode has a larger amplitude than has the voltage signal waveform in the high sensitivity mode.

That is, the inclination A of the signal waveform in FIG. 6 becomes steeper. And as the inclination of the signal waveform becomes steeper, the frequency property is improved while noise carries easily. Whereas when the inclination is reduced, the frequency property is deteriorated, while the noise that is carried is less noticeable.

For the FDA 20 in this embodiment, a current source 17, connected to the source terminal OD2 of the FET 20c that constitutes the amplifier at the final stage of the FDA 20, is controlled in the photographic sensitivity mode. When signal charges are to be read in the high sensitivity mode, the amount of a current supplied to the FET 20c is reduced, and the inclination of the rising amplified signal waveform is reduced to narrow the frequency bandwidth. Accordingly, the deterioration of image data due to noise in the high sensitivity mode is suppressed, and the S/N is improved.

Figure 7:
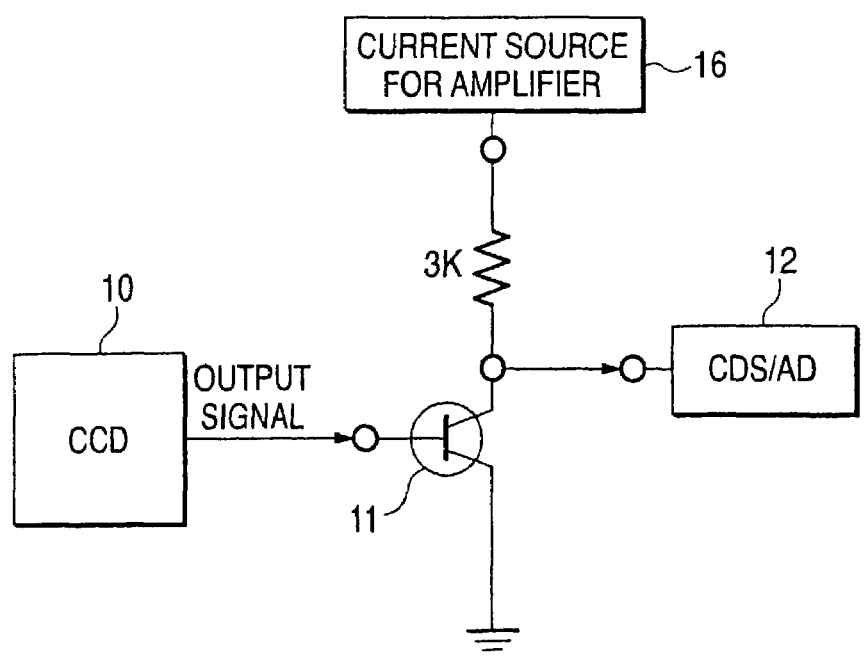
FIG. 7 is a diagram showing the configuration of an example current amplifier in FIG. 4.

FIG. 7 is diagram showing an example for the current amplifier 11 in FIG. 5. For the same reason as that given for the amplifier at the final stage of the FDA 20, in the high sensitivity mode there is also a reduction in the amount of a current that is to be supplied to the current amplifier 11 that amplifies an output signal read by the solid-state image pickup device 10. Therefore, the deterioration of the image quality in the high sensitivity mode can be reduced. It should be noted that, in the high sensitivity mode, one or both of the currents supplied to the FET 20c and to the amplifier 11 may be reduced.

In the solid-state image pickup device 10, power consumption is the greatest at the final stage of the FDA 20, and since the current flowing across the final stage is reduced, overall, the consumption of power and the generation of heat by the FDA 20 can be reduced. Especially when the number of pixels for the solid-state image pickup device 10 is increased, the generation of heat can be better suppressed, and deterioration of the image quality due to the generation of heat can be reduced.

These effects can be obtained by independently applying the first and the second embodiments for the digital still camera. However, it is most preferable that both of the two embodiments be employed for the digital still camera, because a multiplication of the effects available with the embodiments can be obtained.

According to the digital still camera of the invention, high quality image data can be read from the solid-state image pickup device both in the high sensitivity mode and in the low sensitivity mode.

What is claimed is:

1. A digital still camera, comprising:
 a solid state image pickup device for reading signal charges accumulated in imaging pixels and transferring said signal charges along a vertical transfer path, wherein color filters of said imaging pixels are horizontally arranged so as to form same patterns on every other line;
 a shooting mode selector for selecting either a low sensitivity mode or a high sensitivity mode;
 an image pickup device driver for, when said shooting mode selector selects said low sensitivity mode, reading signal charges from said image pickup device in the full-pixel reading mode, and for, when said shooting mode selector selects said high sensitivity mode, reading signal charges from said image pickup device in two or more even-numbered field reading modes; and
 a current controller controlling a strength of current supplied to an output signal amplification circuit provided at a final stage of the image pickup device or for controlling a strength of current supplied to a current amplification circuit connected to an output terminal of the image pickup device or both,
 wherein when the current controller controls the strength of the current supplied to the output signal amplification circuit, the current controller controls the strength of the current supplied to the output signal amplification circuit when the shooting mode selector selects the high sensitivity mode to be less than the strength of the current supplied to the output signal amplification circuit when the shooting mode selector selects the low sensitivity mode, and wherein when the current controller controls the strength of the current supplied to the current amplification circuit, the current controller controls the strength of the current supplied to the current amplification circuit when the shooting mode selector selects the high sensitivity mode to be less than the strength of the current supplied to the current amplification circuit when the shooting mode selector selects the low sensitivity mode.

2. The digital still camera according to claim 1, wherein said image pickup device driver controls a sweep-off operation in accordance with the selected sensitivity mode, wherein said sweep-off operation is performed in order to sweep off signal charges remaining in the vertical transfer path and avoid mixing colors.

3. The digital still camera according to claim 2, wherein said image pickup device driver controls the sweep-off operation so as to be performed immediately following exposure period, if the low sensitivity mode is selected.

4. The digital still camera according to claim 2, wherein said image pickup device driver controls the sweep-off operation so as to be performed at least twice, immediately following exposure period and immediately following reading signal charges in the imaging pixels of odd-numbered rows, if the high sensitivity mode is selected.

5. A digital still camera, comprising:

a solid state image pickup device including an output signal amplification circuit provided at a final stage of said image pickup device;

a current amplification circuit connected to the output terminal of said image pickup device;

a first current source for supplying a current to said output signal amplification circuit;

a second current source for supplying a current to said current amplification circuit; and a current controller for, when a high sensitivity shooting mode is used for which the sensitivity is equal to or greater than a predetermined value, controlling either said current supplied to said output signal amplification circuit by said first current source or said current supplied to said current amplification circuit by said second current source, wherein when the current controller controls the first current source, the current controller controls a strength of the current supplied by the first current source when the high sensitivity shooting mode is used to be less than the strength of the current supplied by the first current source when the high sensitivity shooting mode is not used, and wherein when the current controller controls the second current source, the current controller controls a strength of the current supplied by the second current source when the high sensitivity shooting mode is used to be less than the strength of the current supplied by the second current source when the high sensitivity shooting mode is not used.

6. The digital still camera according to claim 5, further comprising:

a charge transfer system configured to receive and transfer signal charges accumulated in the solid state image pickup device; and an image pickup driver for controlling reading operations, wherein when the high sensitivity shooting mode is not used, the image pickup driver controls the reading operations such that all of the accumulated signal charges from the solid state image pickup device are transferred to the charge transfer system, and wherein when the high sensitivity shooting mode is used, the image pickup driver controls the reading operations such that a first subset of the accumulated signal charges from the solid state image pickup device are transferred to the charge transfer system, and subsequently a second subset of the accumulated signal charges from the solid state image pickup device are transferred to the charge transfer system, and wherein the first and second subsets are both less than the whole and are not equal to each other.

7. A digital still camera, comprising:

image pickup means for reading signal charges accumulated in imaging pixels and transferring said signal charges along a vertical transfer path, wherein color filters of said imaging pixels are horizontally arranged so as to form same patterns on every other line;

shooting mode selecting means for selecting either a low sensitivity mode or a high sensitivity mode;

driving means for driving said image pickup means, wherein, when said shooting mode selecting means selects said low sensitivity mode, said driving means reads signal charges from said image pickup device in the full-pixel reading mode, and when said shooting mode selecting means selects said high sensitivity mode, said driving means reads signal charges from said image pickup means in two or more even-numbered field reading modes; and current controlling means controlling a strength of current supplied to output signal amplification means provided at a final stage of the image pickup means or for controlling a strength of current supplied to current amplification means connected to an output terminal of the image pickup means or both, wherein when the current controlling means controls the strength of the current supplied to the output signal amplification means, the current controlling means controls the strength of the current supplied to the output signal amplification means when the shooting mode selecting means selects the high sensitivity mode to be less than the strength of the current supplied to the output signal amplification means when the shooting mode selecting means selects the low sensitivity mode, and wherein when the current controlling means controls the strength of the current supplied to the current amplification means, the current controlling means controls the strength of the current supplied to the current amplification means when the shooting mode selecting means selects the high sensitivity mode to be less than the strength of the current supplied to the current amplification means when the shooting mode selecting means selects the low sensitivity mode.

8. A digital still camera, comprising:

image pickup means including an output signal amplification circuit provided at a final stage of said image pickup means;

a current amplification circuit connected to the output terminal of said image pickup means;

first current supplying means for supplying a current to said output signal amplification circuit;

second current supplying means for supplying a current to said current amplification circuit; and current control means for controlling either said current supplied to said output signal amplification circuit by said first current supplying means or said current supplied to said current amplification circuit by said second current supplying means, when a high sensitivity mode having a value of sensitivity equal to or greater than a predetermined value is used for shooting image, wherein when the current control means controls the first current supplying means, the current control means controls a strength of the current supplied by the first current supplying means when the high sensitivity shooting mode is used to be less than the strength of the current supplied by the first current supplying means when the high sensitivity shooting mode is not used, and wherein when the current control means controls the second current supplying means, the current control means controls a strength of the current supplied by the second current supplying means when the high sensitivity shooting mode is used to be less than the strength of the current supplied by the second current supplying means when the high sensitivity shooting mode is not used.

9. The digital still camera according to claim 8, further comprising:

a charge transfer system configured to receive and transfer signal charges accumulated in the image pickup means; and an image pickup driver for controlling reading operations, wherein when the high sensitivity shooting mode is not used, the image pickup driver controls the reading operations such that all of the accumulated signal charges from the image pickup means are transferred to the charge transfer system, and wherein when the high sensitivity shooting mode is used, the image pickup driver controls the reading operations such that a first subset of the accumulated signal charges from the image pickup means are transferred to the charge transfer system, and subsequently a second subset of the accumulated signal charges from the image pickup means are transferred to the charge transfer system, and wherein the first and second subsets are both less than the whole and are not equal to each other.

10. A method for shooting images by a digital still camera, comprising the steps of:

selecting shooting mode for selecting either a low sensitivity mode or a high sensitivity mode;

shooting image for picking up an image data and accumulating signal charges of the image data into each imaging pixel of a solid state image pickup device; and driving an image pickup device for, if the low sensitivity mode is selected, reading the signal charges from said image pickup device in the full-pixel reading mode, and for, if the high sensitivity mode is selected, reading the signal charges from said image pickup device in two or more even-numbered field reading modes; and controlling an amount of current supplied to an output signal amplification circuit provided at a final stage of the image pickup device such that the amount of the current supplied to the output signal amplification circuit when the high sensitivity mode is selected is less than the amount of current supplied to the output signal amplification circuit when the low sensitivity mode is selected, or controlling an amount of current supplied to a current amplification circuit connected to an output terminal of the image pickup device such that the amount of the current supplied to the current amplification circuit when the high sensitivity mode is selected is less than the amount of current supplied to the current amplification circuit when the low sensitivity mode is selected, or both.

11. A method for shooting images by a digital still camera, comprising the steps of:

measuring brightness for photometry process and measuring distance, when a shutter release button is pressed halfway down;

checking shooting mode whether a sensitivity is set by a user or not, and setting a sensitivity automatically if the sensitivity is not set by a user;

shooting image for picking up an image data of an object according to a light value obtained by the photometry process and the distance measured, and for accumulating signal charges of the image data into each imaging pixel of a solid state image pickup device, when the shutter release button is pressed completely;

selecting reading mode for selecting full-pixel reading mode if the set sensitivity is equal to or greater than a predetermined value and selecting two-field reading mode if the set sensitivity is smaller than the predetermined value;

reading image data for reading the signal charges of the image data accumulated in the image pickup device in the selected reading mode;

storing the read image data into a memory; and controlling an amount of current supplied to an output signal amplification circuit provided at a final stage of the image pickup device such that the amount of the current supplied to the output signal amplification circuit when the set sensitivity mode is equal to or greater than the predetermined value is less than the amount of current supplied to the output signal amplification circuit when the set sensitivity mode is less than the predetermined value, or controlling an amount of current supplied to a current amplification circuit connected to an output terminal of the image pickup device such that the amount of the current supplied to the current amplification circuit when the set sensitivity mode is equal to or greater than the predetermined value is less than the amount of current supplied to the current amplification circuit when the set sensitivity mode is less than the predetermined value, or both.

12. A digital camera, comprising:

an image sensor configured to sense an image of an object and generate image signal charges corresponding to the image of the object;

a charge transfer system configured to receive and transfer the image signal charges from the image sensor;

a mode selector configured select a sensitivity mode of the digital camera from a plurality of sensitivity modes, wherein the plurality of sensitivity modes include first and second sensitivity modes;

a controller configured to control reading operations of the digital camera, wherein when the mode selector selects the first sensitivity mode, the controller controls the charge transfer system to receive and transfer an entirety of the image signal charges from the image sensor, wherein when the mode selector selects the second sensitivity mode, the controller controls the charge transfer system to receive and transfer a first portion of the image signal charges from the image sensor, and controls the charge transfer system to receive and transfer a second portion of the image signal charges from the image sensor after receiving and transferring the first portion, and wherein the first and second portions are each less than the entirety of the image signal charges and the first and second portions are not equal to each other; and an input device configured to receive an input from a user of the digital camera, wherein when the input from the user received by the input device indicates that the user selected one of the plurality of sensitivity modes, the mode selector selects the sensitivity mode consistent with the user selection, and wherein when the input from the user received by the input device indicates that the user selected none of the plurality of sensitivity modes, the mode selector selects the first sensitivity mode when a brightness of the image of the object is equal to greater than a predetermined brightness value and selects the sensitivity mode when the brightness of the image of the object is less than the predetermined brightness value.

13. The digital camera according to claim 12, wherein when the mode selector selects the second sensitivity mode, the controller controls the charge transfer system to perform a sweep off to clear charges remaining in the charge transfer system after receiving and transferring the first portion and prior to receiving and transferring the second portion.

* * * * *

UNITED STATES PATENT AND TRADEMARK OFFICE
CERTIFICATE OF CORRECTION

PATENT NO. : 7,242,426 B2
APPLICATION NO. : 10/397354
DATED : July 10, 2007
INVENTOR(S) : Takeshi Miyashita et al.

It is certified that error appears in the above-identified patent and that said Letters Patent is hereby corrected as shown below:

Title Pg, Item 73, Assignee:

"Fuji Photo Film Co., Ltd., Kanagawa (JP)" should read --FUJIFILM CORPORATION, Tokyo (JP)--

Signed and Sealed this

Twenty-sixth Day of August, 2008

JON W. DUDAS
*Director of the United States Patent and Trademark Office*